Figure 1:
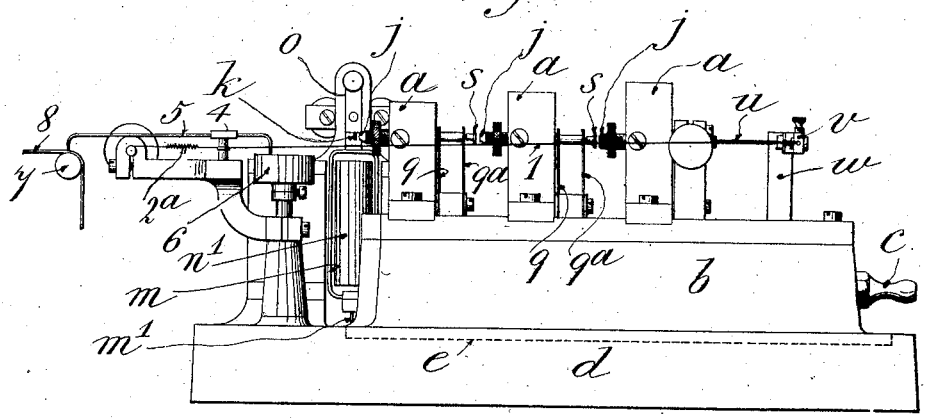

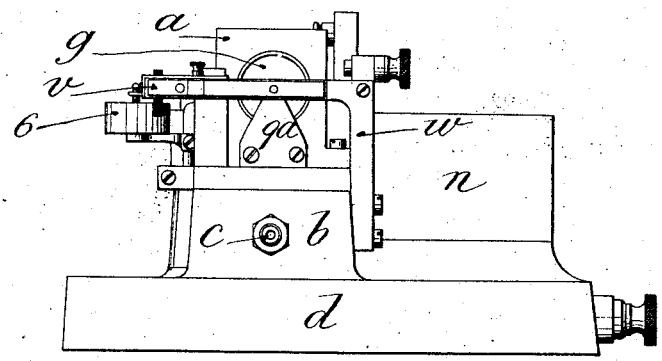
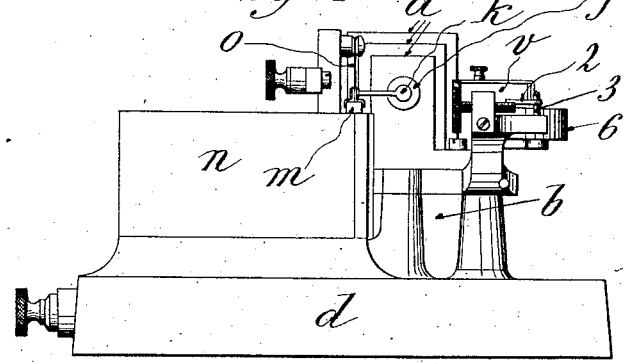
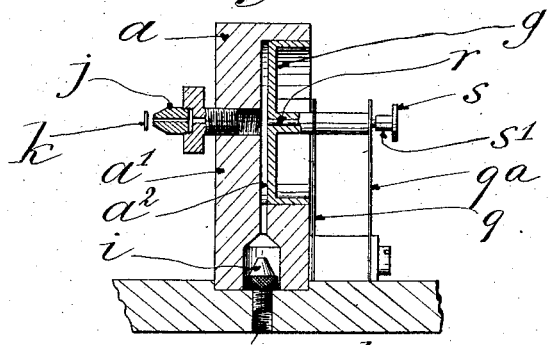

Aug. 23, 1927.
F. G. CREED ET AL
1,639,839
APPARATUS FOR AMPLIFYING SMALL MOVEMENTS
Filed Jan. 29, 1926   3 Sheets-Sheet 3
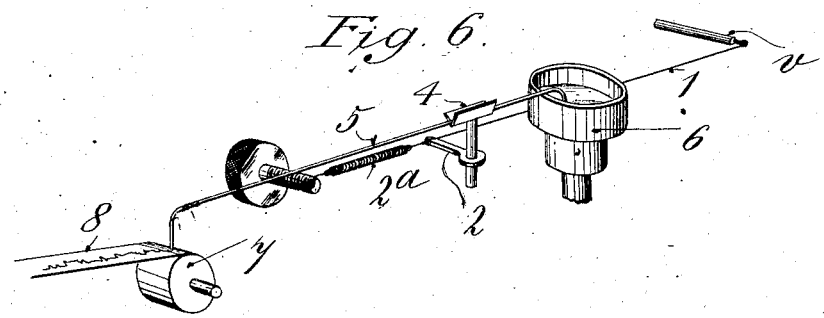
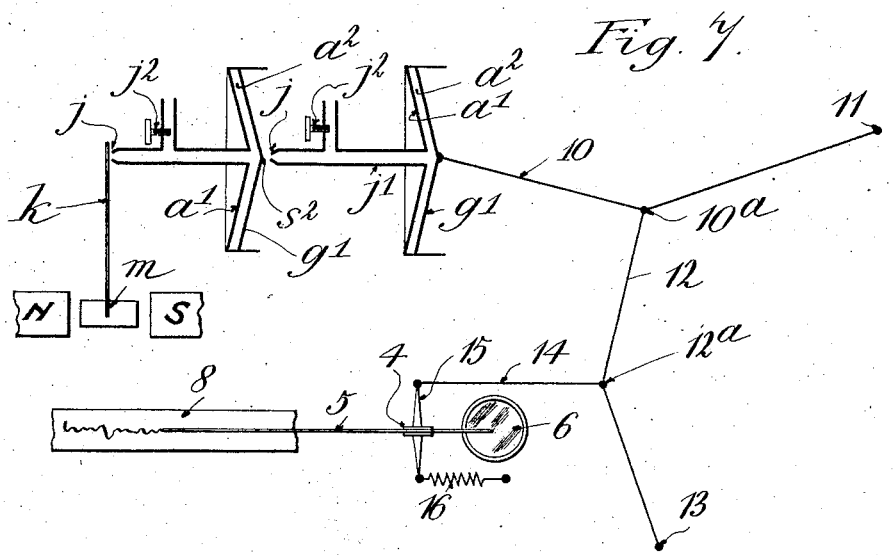
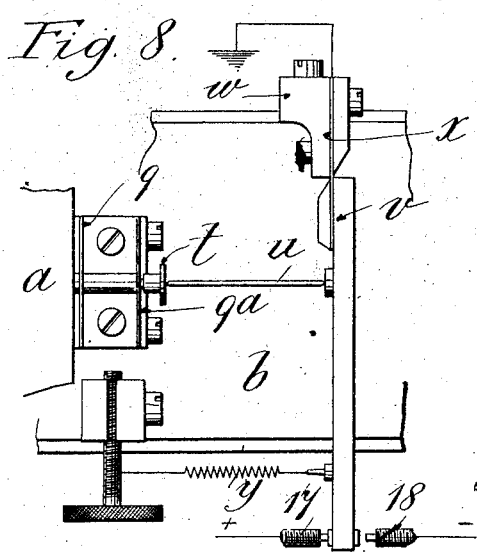

Patented Aug. 23, 1927.

1,639,839

UNITED STATES PATENT OFFICE.

FREDERICK GEORGE CREED, OF CROYDON, AND AXEL ORLING, OF STREATHAM, LONDON, ENGLAND.

APPARATUS FOR AMPLIFYING SMALL MOVEMENTS.

Application filed January 29, 1926, Serial No. 84,721, and in Great Britain February 5, 1925.

This invention has reference to improvements in apparatus for amplifying small movements, particularly those produced by small electrical forces occurring in electrical apparatus of various kinds, and it has for its object to provide apparatus for this purpose of a simple robust, compact and effective character.

For this purpose, in apparatus according thereto, there is associated with a device (hereinafter called the primary movable device) to which only small movements are imparted by forces impressed thereon, a receiver to which fluid under pressure is supplied at a suitable rate and which has an outlet for fluid controlled, as to rate of outflow, by the said primary movable device, secondary movable means responsive to variations in fluid pressure within the receiver and hereinafter called for distinction pressure responsive means, and means hereinafter called for distinction motion amplifying means, responsive to movement of the pressure responsive means and adapted to bring about an amplified movement of some device for effecting either directly, or indirectly through one or more additional amplifying devices or relays, that may be of a mechanical or an electrical nature, some useful effect. The arrangement is such that assuming fluid under pressure is being continuously supplied at a suitable rate to the receiver and is continuously escaping therefrom through its outlet and that the primary movable device is at rest, the pressure responsive means and motion amplifying means will also be at rest and in their normal or a predetermined condition, but upon the primary movable device being caused to move relatively to the outlet of the receiver, it will retard or facilitate the escape of fluid therefrom, as the case may be, and thereby vary the fluid pressure in the receiver and cause the pressure responsive means to act and operate the motion amplifying means to produce some desired useful effect.

The primary movable device may form part, for instance, of an electro-magnetic or electro-static device designed to be operated by electric impulses or signals. The electro-magnetic device may, for example, form part of telegraphic apparatus of the kind comprising a floating movable coil, such as has been used for actuating a syphon recorder, or a mirror galvanometer, but which in apparatus according to the present invention would operate a baffling device, for instance a vane, blade or projection, mounted opposite to but out of contact with the fluid outlet of the fluid pressure receiver so as to be in the path of the issuing jet of fluid in order that flow thereof will be baffled or checked to a definite extent and a predetermined normal pressure set up in the fluid pressure receiver when the baffling device is in its normal position, such normal pressure depending upon the rate of flow of fluid, which is maintained constant, into the receiver. With such an arrangement, when the baffling device moves from its normal position towards the outlet of the receiver, the fluid pressure in the receiver will be increased beyond its normal value, the pressure being restored to the normal value when the baffling device returns to its normal position. If the baffling device moves from its normal position in a direction away from the outlet of the receiver, the flow of fluid from the receiver will be increased and the pressure in the receiver will fall below the normal value, the pressure being restored to normal value when the baffling device moves back to its normal position.

The apparatus may thus be made single acting, or double acting, according as the primary movable device is adapted to be moved only from and towards its normal position, or to be moved from and towards its normal position in opposite directions from its normal position. In the former case, the apparatus comprises a single fluid pressure receiver with fluid outlet and associated pressure responsive means and motion amplifying means that move from and back to normal position. In the second case, the apparatus may comprise a single fluid pressure receiver with fluid outlet and pressure responsive means connected to motion amplifying means, as in the first case, but the pressure responsive means and motion amplifying means will be able to move alternately or intermittently in opposite directions from a mid position and back to such mid position, that is to say, to oscillate. The baffling device can be held in its normal position, against the pressure of the issuing fluid thereon, in any convenient way, as by a spring, or by a torsional force applied to the means used for suspending or supporting the floating movable coil or equivalent, or by directing another jet of fluid similar to the first jet upon the opposite side of the baffling device, so that the fluid pressure on the two sides of such device will be balanced when the device is in its mid or normal position. The second jet may issue from an outlet nozzle connected to the same fluid pressure supply pipe as the first outlet nozzle. In some cases, the second outlet nozzle may extend from a second fluid pressure receiver provided with pressure responsive means and associated motion amplifying means.

The primary movable device instead of being arranged to move towards and from the outlet may be arranged to move transversely to the outlet.

The fluid pressure receiver comprises a chamber which may conveniently be formed by and between two circular walls, one stationary and provided with a fluid outlet nozzle, and the other movable and constituted by a piston which should be adapted to be moved axially with the minimum of friction and which constitutes the pressure responsive device. Or the movable wall of the chamber may be constituted by a flexible diaphragm of suitable material, for example rubber, connected to the periphery of the stationary wall, such flexible diaphragm forming the pressure responsive device. The fluid pressure chamber thus formed may be provided with means, for instance an adjustable screw or valve, for regulating the normal supply of the fluid thereto.

To increase the amplifying effect, two or more fluid pressure receivers or chambers arranged in series, or cascade fashion, may be used, the piston or diaphragm of the first chamber being adapted, as by a rear projection or knob thereon, to control the exit of fluid from the outlet of the next chamber the piston or diaphragm of which is adapted in like manner to control the exit of fluid from a third chamber and so on, the piston or diaphragm of the last chamber being arranged to actuate or control, mechanically, electrically, or otherwise, the device by which the magnified movements of the primary movable device are to be detected and utilized. In this case the pressure of the fluid admitted to the successive chambers may be different in the various chambers if desired. Or the pressure of the fluid supply may be maintained constant and the chambers be of successively increasing diameter.

As will be obvious, apparatus of the kind referred to, adapted to operate in the manner set forth, can be constructed in various forms and be used for various purposes.

Figure 2:
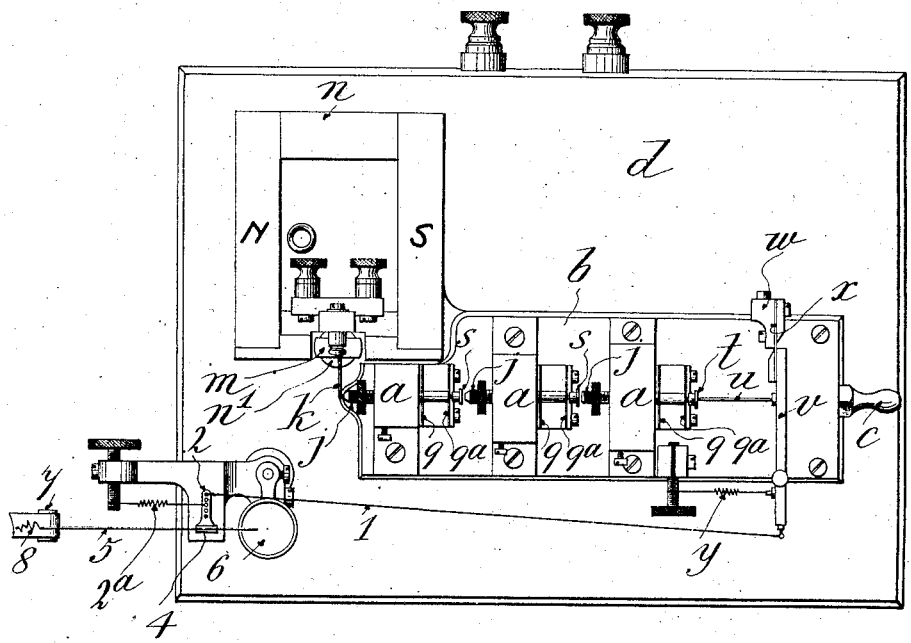

In the accompanying illustrative drawings, Fig. 1 is a side elevation, Fig. 2 a plan and Figs. 3 and 4 end elevations, showing one construction of apparatus according to the invention, suitable for operating the recording syphon of a telegraphic instrument. Fig. 5 shows in longitudinal vertical section, one of the fluid pressure cylinders with associated pressure responsive device, used in the said apparatus. Fig. 6 is a diagrammatic view of a syphon recorder and the means for directly operating it. Fig. 7 is a diagrammatic view showing a modification. Fig. 8 shows a further modified construction.

In the example shown in Figs. 1 to 6 inclusive, there are three fluid pressure receivers $a$ fixed to the top of a compressed air chamber $b$ having a compressed air inlet $c$ and carried by a hollow base plate $d$, the bottom of the air chamber being formed by a plate $e$ soldered in place. Each receiver $a$ is constituted by a metal body (see Fig. 5) having therein a cylindrical cavity provided at one end with a stationary wall $a^1$ and fitted with an endways movable piston $g$, the space between the wall, piston and surrounding wall of the casing forming a compressed air chamber $a^2$ that is in communication with the compressed air supply chamber $b$ through a passage $h$ fitted with a removable nozzle $i$. The front wall $a^1$ is provided with a fluid outlet nozzle $j$ through which compressed air will issue from the chamber $a^2$. $k$ is a baffling device arranged opposite the air outlet nozzle $j$ of the first receiver $a$. It consists of a vane carried by a floating coil $m$ adapted to be connected to an electric land line or submarine cable and arranged between the poles N S of an electro-magnet $n$, a stationary iron core $n^1$ being arranged within the coil. The vane is held in its normal position by a slight torsion applied to the suspension means $o$ of the coil $m$ which may, as shown, be of the usual bifilar construction. $m^1$ is a spring to steady the coil. To the piston $g$ is connected a rod $r$ the outer end of which is provided with a baffling device $s$ in the form of a disc provided with a sleeve $s^1$ by which it can be fixed to the rod. The baffling device $s$ is arranged opposite the air outlet nozzle $j$ of the second compressed air receiver $a$ the piston of which is similarly provided with a rod $r$ carrying a baffling device $s$ arranged opposite the air outlet nozzle $j$ of the third compressed air receiver $a$. The piston of the latter receiver is similarly provided with a rod $r$ having at its outer end a device $t$ similar to the baffling devices $s$, but which acts as an abutment for one end of a thrust rod $u$ the other end of which acts against an intermediate portion of a motion amplifying lever $v$. This lever is movable at one end about a fixed support $w$, for which purpose it may advantageously be connected to such support by a spring blade $x$ fixed at its two end portions to the said lever and support respectively. $y$ is a spring that serves to keep the lever $v$ in firm connection, through the thrust rod $u$, with the abutment device $t$. The outer free end of the lever $v$ is connected through a thread 1 (see Fig. 6) with a lever arm 2 fixed to a vertical spindle 3 carrying the saddle piece 4 commonly used for supporting the syphon 5 of an ordinary syphon recorder. $2^a$ is a spring connected to the lever arm 2 and adapted normally to balance the opposing action of the lever $v$ and hold the syphon in its normal mid-position 6 in the ink well for the syphon and 7 a roller over which passes a tape 8 upon which telegraph signals are recorded by the syphon in the ordinary way. In the example shown, the compressed air chambers $a^2$ in the successive receivers $a$ and the movable pistons $g$ therein, are made of increasing diameter from left to right, air of the same pressure being admitted to each chamber, so that the force exerted by the successive pistons will be of increasing value. Or, for a like purpose, the several compressed air chambers $a^2$ and the pistons $g$ could be made of the same diameter and air at successively increasing pressure be admitted to the several chambers $a^2$.

The arrangement is such that normally, the baffling vane $k$, the baffling devices $s$ and abutment device $t$ will be held in their normal mid positions, as also will be the syphon 5, and compressed air will be issuing from all the outlet nozzles $j$ at a predetermined rate, depending upon the pressure of the air supplied to the compressed air chambers $a^2$ and the size of the outlet passages in the nozzles, the whole forming a balanced system. When a telegraph signal or impulse is received by the movable coil $m$, the vane $k$ will be caused by the coil to move either towards or from the compressed air nozzle $j$ of the first compressed air chamber $a^2$, depending upon the sign, positive or negative, of the signal, and will in consequence either baffle the air flowing out of the nozzle $j$ of the first receiver $a$ to a greater extent than before, so as to increase the air pressure in the chamber $a^2$, or will exert a less baffling action on the issuing air and permit the air pressure in the chamber $a^2$ to fall. The result will be to cause the piston $g$ in the first chamber $a^2$ to move to the right or left as the case may be, and cause its baffling device $s$ to act on the air issuing from the nozzle $j$ of the second chamber $a^2$ in a similar manner to the vane $k$ in relation to the air issuing from the nozzle $j$ of the first chamber $a^2$. The piston of the second chamber will consequently be caused to move to the right or left and cause its baffling device $s$ to act in like manner on the air issuing from the nozzle $j$ of the third chamber. The piston of the latter chamber will consequently either move the motion amplifying lever $v$ through the abutment device $t$ and thrust rod $u$ to the right and move the recording end of the syphon 5 in one direction on the recording tape 8 against the action of the springs $y$ and $2^a$, or will allow the said lever $v$ to be moved to the left by the action of the said springs so as to cause the free end of the syphon 5 to move in the opposite direction on the recording tape.

In order that each piston $g$ may move freely to and fro within the cylindrical cavity of its respective body or casing $a$, so as practically to eliminate sliding friction, it may be made slightly smaller in diameter than the cavity, say one thousandth of an inch less in diameter, and be supported by its rod $r$ in the upper ends of two spring blades 9 and $9^a$ in such manner that it does not touch the body or casing $a$.

Fig. 7 shows diagrammatically, a modified construction wherein each fluid pressure chamber $a^2$ is formed by and between a stationary wall $a^1$ and flexible diaphragm $g^1$, as hereinbefore described, the stationary wall being provided with a fluid outlet nozzle $j$ to which is connected a branch air supply pipe $j^1$ provided with a regulating valve or screw $j^2$ for controlling the rate of flow of air under pressure into the chamber. The baffling device arranged opposite the outlet nozzle, consists of a vane $k$ carried by a floating coil $m$, as in the arrangement hereinbefore described.

In this example two fluid pressure chambers $a^2$ are shown. The central portion $s^1$ of the flexible diaphragm $g^1$ of the first chamber $a^2$ is arranged to act as a baffling device for the air issuing from the outlet nozzle $j$ of the next chamber $a^2$, as and for the purpose hereinbefore described. To the centre of the flexible diaphragm $g^1$ of the second and last chamber $a^2$ is connected to one end of a length 10 of flexible material, for instance silk fibre, the other end of which is connected to a stationary holder 11. To an intermediate point $10^a$ of the length 10 of flexible material is connected one end of another length 12 of similar material the other end of which is fixed to another stationary holder 13. To an intermediate point $12^a$ of this second length 12 of flexible material is connected one end of a straight length 14 of similar material the other end of which is connected to one end of a lever 15 carrying a recording syphon 5. The other end of the lever may be connected to a spring 16. Or the syphon may be supported by a bifilar suspension through a pin that is connected to the straight length 14 of flexible material. The arrangement is such that under the action of the spring 16, or bifilar suspension, each of the lengths 10 and 12 of flexible material is held in a bent or angular position, as shown, and normally, the syphon 5 is held in its mid position, and that by movement of the vane $k$ to and fro past its mid or normal position, opposite the outlet nozzle $j$ of the first fluid pressure chamber $a^2$, in accordance with received electric signals or impulses, the flexible diaphragm $g^1$ will be moved to and fro controlling the action of the diaphragm $g^1$ of the second fluid pressure chamber $a^2$ and, through the motion amplifying means, constituted by the lengths 10 and 12 of flexible material, and amplifying movement of the syphon 5 to and fro across its mid-position on the tape 8 will result, in accordance with the said electric signals or impulses received.

The flexible diaphragm $g^1$ of the fluid pressure receiver, or of the last receiver, could of course be connected to a motion amplifying lever like that shown in Figs. 1 to 4.

In arrangements such as described, the dimensions of the fluid pressure chamber $a^2$ controlled by the primary movable device such as the vane $k$, and its outlet, such as the nozzle $j$, will usually be small. For instance, the diameter of the chamber may be of the order of say one inch, the axial distance between the fixed and movable walls, when the latter is subjected to air pressure, be of the order of say one thirty-second of an inch and the diameter of the air passage in the outlet nozzle be of the order of say one hundredth of an inch, so that the cross sectional area of the passage in this outlet nozzle in relation to that of the piston or flexible diaphragm will be as one to ten thousand. When several fluid pressure receivers are used, the diameter of their several chambers $a^2$, if the pressure of the air supplied to each chamber be maintained constant, may for example be in the ratio of 1, 1.25, 1.5. The supply pressure of the fluid used, namely air, may for example, be two or three pounds to the square inch. The inner face of the stationary wall of the receiver chamber, or of each receiver chamber, when a flexible diaphragm is used, may, as shown in Fig. 7, be of a flattened conical or convex shape, and the movement of the central portion of the flexible diaphragm in relation thereto may be of the order of say about one hundredth of an inch. Each of the two lengths 10 and 12 of flexible material (Fig. 7), when such is used, may for example be about six inches long. The dimensions of the various parts can however be varied according to the period and the amplitude of movement of the primary movable device and the magnification desired.

Apparatus according to the invention can advantageously be used in connection with land line, ocean cables and wireless telegraphic apparatus for operating, through electric relay arrangements, other telegraphic apparatus for reproducing, in amplified form, weak electric signals or impulses. Thus, the free end of the lever $v$ may, for the purpose just mentioned, be arranged to work between contacts 17 and 18 of an electric relay as shown in Fig. 8.

What we claim is:—

1. For amplifying small movements, apparatus comprising a fluid pressure receiver having an inlet and an outlet for fluid under pressure, a movable device, subject to small forces, arranged opposite to and at all times out of contact with the outlet of said receiver and adapted by its movement to control the exit of fluid therefrom and pressure responsive means subject to variations of fluid pressure within said receiver and means responsive to movement of said pressure responsive means.

2. For amplifying small movements, apparatus comprising a fluid pressure receiver having an inlet and an outlet for fluid under pressure, movable baffling means subject to small forces, arranged opposite to and at all times out of contact with said outlet and adapted by its movement to control the exit of fluid from said receiver, pressure responsive means subject to variations of fluid pressure within said receiver, and motion amplifying means responsive to movement of said pressure responsive means.

3. For amplifying small movements, a fluid pressure receiver having an inlet and an outlet for fluid under pressure, a movable baffling means arranged opposite to and at all times out of contact with the said outlet and adapted by its movements to vary the exit of fluid from said receiver, means adapted to actuate said baffling means and subject to and movable by small forces applied thereto, presure responsive means subject to variations of fluid pressure within said receiver and motion amplifying means responsive to movement of said pressure responsive means.

4. For amplifying small movements, a fluid pressure receiver having an inlet and an outlet for fluid under pressure, movable baffling means arranged opposite to and at all times out of contact with said outlet and adapted to vary the exit of fluid from said receiver, means subject to small electrical forces of a varying nature, adapted to actuate said baffling means, and pressure responsive means subject to variations of fluid pressure within said receiver.

5. For amplifying small movements, a fluid pressure receiver having an inlet and an outlet for fluid under pressure, movable baffling means arranged opposite to and at all times out of contact with said outlet and adapted by its movement to vary the exit of fluid from said receiver, telegraphic apparatus embodying a movable member responsive to small electrical forces applied thereto, connected to and adapted to actuate said baffling means, pressure responsive means subject to variation of fluid pressure within said receiver and motion amplifying means responsive to movement of said pressure responsive means.

6. For amplifying small movements, a fluid pressure receiver having an inlet and an outlet for fluid under pressure, movable baffling means arranged opposite to and at all times out of contact with said outlet and adapted by its movement to vary the exit of fluid from said receiver, telegraphic apparatus having a movable coil responsive to small electrical forces applied thereto, connected to and adapted to actuate said baffling means, pressure responsive means subject to variation of fluid pressure within said receiver and motion amplifying means responsive to movement of said pressure responsive means.

7. For amplifying small movements, a fluid pressure receiver having an inlet and an outlet for fluid under pressure, movable baffling means arranged opposite to and at all times out of contact with said outlet and adapted by its movement to vary the exit of fluid from said receiver, telegraphic apparatus having a movable member responsive to small electrical forces applied thereto and connected to said baffling means, yielding means adapted normally to hold said baffling means in a mid position of movement, pressure responsive means subject to variation of pressure within said receiver and motion amplifying means responsive to movement of said pressure responsive means.

8. For amplifying small movements, a fluid pressure receiver having an inlet and an outlet for fluid under pressure, movable baffling means arranged opposite to and at all times out of contact with said outlet and adapted by its movement to vary the exit of fluid from said receiver, telegraphic apparatus having a movable member responsive to small electrical forces applied thereto and connected to said baffling means, yielding means adapted normally to hold said baffling means in a mid position of movement, pressure responsive means subject to variation of pressure within said receiver, motion amplifying means responsive to movement of said pressure responsive means and means adapted to utilize the movement of said motion amplifying means.

9. For amplifying small movements, apparatus comprising a fluid pressure receiver having an inlet and an outlet for fluid under pressure, a movable device, subject to small forces, arranged opposite to and at all times out of contact with the outlet of said receiver and adapted by its movement to control the exit of fluid therefrom, a piston mounted to reciprocate within said receiver in response to variations of fluid pressure therein and motion amplifying means responsive to the movements of said piston.

10. A fluid pressure receiver having an inlet and an outlet for fluid under pressure, a piston arranged within but of slightly less diameter than said receiver and means for supporting said piston in such manner that it is axially movable in response to varying pressure within said receiver but is out of direct sliding contact with said receiver.

11. A fluid pressure receiver having an inlet and an outlet for fluid under pressure, a piston arranged within but of slightly less diameter than said receiver and spring means adapted to support said piston in such manner that it is axially movable in response to varying fluid pressure within said receiver but is out of direct sliding contact with said receiver.

12. For amplifying small movements, apparatus comprising a plurality of fluid pressure receivers each having an inlet and an outlet for fluid under pressure, a piston mounted within each of said receivers and each axially movable in response to variations of fluid pressure within its receiver, a movable baffling device arranged oppositely to and at all times out of contact with the outlet of each cylinder, the baffling device of the first receiver being subject to small forces to be utilized and the baffling device of each succeeding receiver being movable by the piston in a preceding receiver and means responsive to the movements of the piston of the last receiver of the series.

13. For amplifying small movements, apparatus comprising a plurality of fluid pressure receivers each having an inlet for fluid under pressure and an outlet nozzle for said fluid, an axially movable spring controlled piston mounted in each receiver so as to be out of direct sliding contact therewith and responsive to variations of fluid pressure therein, a baffling device mounted opposite to and at all times out of contact with the outlet nozzle of each receiver, the baffling device for the first receiver being adapted to be actuated by small forces to be utilized, and the baffling device of each succeeding receiver being actuated by the piston of a preceding receiver, and motion amplifying means responsive to the movements of the piston of the last receiver.

14. For amplifying small movements, apparatus comprising a plurality of fluid pressure receivers of successively increasing cross sectional area and each having an inlet for fluid under pressure and an outlet of very small cross sectional area compared to that of its receiver and through which fluid can flow, a fluid pressure supply chamber common to and in communication with the inlet of each receiver, a spring controlled floating piston mounted within each receiver and responsive to variations of fluid pressure therein, a movable coil subject to electric forces of small value means for normally holding such coil in a mid-position of movement, a movable baffling device mounted opposite to and at all times out of contact with the outlet of each receiver, the baffling device for the first receiver being adapted to be actuated by said movable coil and the baffling device for each succeeding receiver being actuated by the piston of the preceding receiver, and motion amplifying means responsive to the movement of the piston of the last receiver.

15. The combination with apparatus according to claim 14 of means controlled by said motion amplifying means and adapted to utilize the movements thereof for effecting some useful purpose.

16. The combination with apparatus according to claim 14, of an electric relay actuated by said motion multiplying means.

17. An automatic control device comprising a cylinder having inlet and outlet passages for fluid under pressure and a movable end wall constituted by a floating piston and means for controlling the exit of fluid through said outlet, the movable end wall being responsive to variations of fluid pressure set up in said cylinder.

18. An automatic control apparatus comprising a cylinder having inlet and outlet passages for fluid under pressure, movable baffling means for controlling the flow of fluid through said outlet passage, a piston made of slightly smaller diameter than the interior of said cylinder and having a rod extending from one side thereof and a pair of spring blades fixed at one end and having their other ends engaging said rod and acting to hold said piston out of contact with said cylinder.

Signed at Paris, France this 18th day of January, 1926.

FREDERICK GEORGE CREED.
AXEL ORLING.